United States Patent
Lee et al.

(10) Patent No.: US 10,371,975 B2
(45) Date of Patent: Aug. 6, 2019

(54) BACKLIGHT UNIT AND LIQUID CRYSTAL DISPLAY DEVICE INCLUDING THE SAME

(71) Applicant: Samsung Display Co. Ltd., Yongin-si (KR)

(72) Inventors: Sun Ho Lee, Hwaseong-si (KR); Hyun Chul Jeong, Suwon-si (KR); Yoon Ki Hong, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/805,761

(22) Filed: Nov. 7, 2017

(65) Prior Publication Data

US 2018/0129095 A1 May 10, 2018

(30) Foreign Application Priority Data

Nov. 10, 2016 (KR) .......................... 10-2016-0149827

(51) Int. Cl.
*F21V 8/00* (2006.01)
*G02F 1/1333* (2006.01)
*G02F 1/1335* (2006.01)

(52) U.S. Cl.
CPC ..... *G02F 1/133308* (2013.01); *G02B 6/0053* (2013.01); *G02B 6/0055* (2013.01); *G02B 6/0091* (2013.01); *G02F 1/133603* (2013.01); *G02F 1/133608* (2013.01); *G02F 1/133615* (2013.01); *G02B 6/0043* (2013.01)

(58) Field of Classification Search
CPC ......... G02F 1/133308; G02F 1/133603; G02F 1/133608; G02F 1/133615; G02F 2001/133322; G02B 6/0053; G02B 6/0055; G02B 6/0091; G02B 6/0043
See application file for complete search history.

(56) References Cited

U.S. PATENT DOCUMENTS

2008/0130318 A1 6/2008 Park et al.
2011/0069510 A1* 3/2011 Yamashita ........... G02B 6/0085
362/612

(Continued)

FOREIGN PATENT DOCUMENTS

JP 2011113865 6/2011
KR 1020120126608 11/2012

(Continued)

*Primary Examiner* — Nathanael R Briggs
(74) *Attorney, Agent, or Firm* — Cantor Colburn LLP

(57) ABSTRACT

A backlight unit includes a light guide plate including a first incident surface; a light source module including a first sub-light source module overlapping the first incident surface of the light guide plate in a first direction, where the first sub-light source module provides light to the first incident surface; and a distance adjusting member including a first sub-distance adjusting member overlapping the first incident surface of the light guide plate in the first direction and disposed at a first side of the first sub-light source module and a second sub-distance adjusting member disposed at a second side of the first sub-light source module, which is opposite to the first side of the first sub-light source module. The first sub-distance adjusting member and the second sub-distance adjusting member may move the light guide plate in the first direction.

20 Claims, 14 Drawing Sheets

(56) References Cited

U.S. PATENT DOCUMENTS

| | | | | |
|---|---|---|---|---|
| 2011/0110115 A1* | 5/2011 | Hashimoto | ......... | G02B 6/0091 |
| | | | | 362/606 |
| 2015/0177453 A1* | 6/2015 | Ikuta | ................ | G02B 6/0073 |
| | | | | 348/794 |
| 2015/0219954 A1* | 8/2015 | Kubo | ............... | G02F 1/133308 |
| | | | | 348/794 |
| 2015/0226996 A1* | 8/2015 | Ohashi | ............... | G02B 6/0011 |
| | | | | 348/725 |

FOREIGN PATENT DOCUMENTS

| KR | 20130001083 A | * | 1/2013 |
|---|---|---|---|
| KR | 1020130001083 | | 1/2013 |
| KR | 1020140036862 | | 3/2014 |
| KR | 1020140039425 | | 4/2014 |

* cited by examiner

BACKLIGHT UNIT AND LIQUID CRYSTAL DISPLAY DEVICE INCLUDING THE SAME

This application claims priority to Korean Patent Application No. 10-2016-0149827, filed on Nov. 10, 2016, and all the benefits accruing therefrom under 35 U.S.C. § 119, the content of which in its entirety is herein incorporated by reference.

BACKGROUND

1. Field

Embodiments of the invention relate to a backlight unit and a liquid crystal display device including the backlight unit.

2. Description of the Related Art

The importance of a display device has increased with the development of multimedia. Accordingly, various types of display device, such as a liquid crystal display ("LCD") and an organic light-emitting display ("OLED"), have been used.

Among the various types of display device, an LCD device is one of the most widely used types of flat panel display device. The LCD device typically includes two substrates having electric field generating electrodes such as a pixel electrode and a common electrode, and a liquid crystal layer interposed between the two substrates. Such a liquid crystal display device is configured such that a voltage is applied to the electric field generating electrodes to generate an electric field in the liquid crystal layer, so that the alignment of liquid crystal molecules is determined and the polarization of incident light is controlled, thereby displaying an image.

A liquid crystal display device typically includes a display panel for displaying an image and a backlight unit for providing light to the display panel. The backlight unit may be classified into an edge type backlight unit and a direct type backlight unit according to the position of a light source. The edge type backlight unit may be configured such that a light source is disposed on a side surface of a light guide plate that guides light from the light source to the display panel.

SUMMARY

An embodiment of the invention relate to a backlight unit, which adjusts a distance between a light guide plate and a light source module by moving the light guide plate using a distance adjusting member.

Another embodiment of the invention relate to a liquid crystal display device including the backlight unit, which adjusts a distance between a light guide plate and a light source module by moving the light guide plate using the distance adjusting member.

According to an exemplary embodiment of the invention, a backlight unit, includes: a light guide plate including a first incident surface; a light source module including a first sub-light source module overlapping the first incident surface of the light guide plate in a first direction, where the first sub-light source module provides light to the first incident surface; and a distance adjusting member including a first sub-distance adjusting member overlapping the first incident surface of the light guide plate in the first direction and disposed at a first side of the first sub-light source module and a second sub-distance adjusting member disposed at a second side of the first sub-light source module, which is opposite to the first side of the first sub-light source module.

In such an embodiment, the first sub-distance adjusting member and the second sub-distance adjusting member may move the light guide plate in the first direction.

According to another exemplary embodiment of the invention, a liquid crystal display device includes: a display panel; a light guide plate disposed under the display panel; a light source module including a first sub-light source module overlapping a first side surface of the light guide plate in a first direction; and a first distance adjusting member pressing a second side surface of the light guide plate to move the light guide plate in the first direction, where the second side surface is opposite to the first side surface.

BRIEF DESCRIPTION OF THE DRAWINGS

The above and other aspects and features of the invention will become more apparent by describing in detail exemplary embodiments thereof with reference to the attached drawings, in which.

DETAILED DESCRIPTION OF THE EMBODIMENTS

Figure 1:
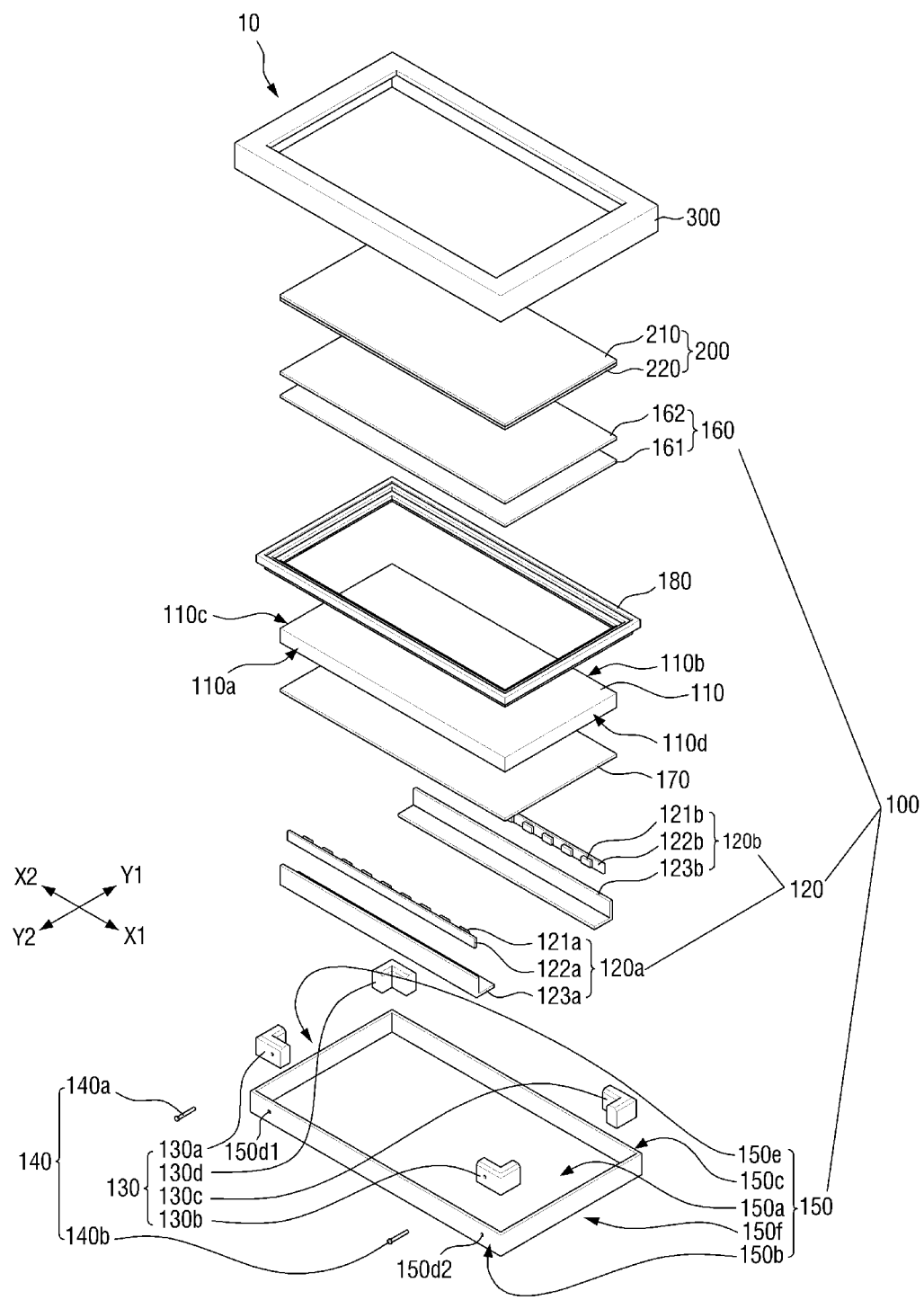
FIG. 1 is an exploded perspective view showing a liquid crystal display device according to an embodiment of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments will be described with reference to the accompanying drawings.

FIG. 1 is an exploded perspective view showing a liquid crystal display device according to an embodiment of the invention.

Referring to FIG. 1, an embodiment of a liquid crystal display device 10 according to the invention may include a backlight unit 100, a display panel 200, and a top chassis 300.

The backlight unit 100 may include a light guide plate 110, a light source module 120, a support member 130, a distance adjusting member 140, a bottom chassis 150, an optical sheet 160 and a reflective sheet 170.

The light guide plate 110 provides (e.g., guides) light generated from the light source module 120 to the display panel 200. In an embodiment, the light guide plate 110 may have a rectangular shape, but the invention is not limited thereto. The shape of the light guide plate 110 may be variously changed depending on the shape of the display panel 200. The light guide plate 110 may include or be made of a light-transmitting material. In an embodiment, the light guide plate 110 may include or be made of polycarbonate ("PC"), polysulfone, polyacrylate, polystyrene, polyvinyl alcohol, polyvinyl chloride, polyester, or the like.

The light guide plate 110 may include a first incident surface 110a and a second incident surface 110b.

The first incident surface 110a of the light guide plate 110 faces a first sub-light source module 120a of the light source module 120, and receives light from the first sub-light source module 120a. In an embodiment, the first sub-light source module 120a may overlap the first incident surface 110a of the light guide plate 110 in a first direction Y1.

The second incident surface 110b of the light guide plate 110 faces a second sub-light source module 120b of the light source module 120, and receives light from the second sub-light source module 120b. In an embodiment, the second sub-light source module 120b may overlap the second incident surface 110b of the light guide plate 110 in a second direction Y2 opposite to the first direction Y1.

The light guide plate 110 may further include a first side surface 110c and a second side surface 110d facing the first side face 110c. The first side surface 110c and second side face 110d of the light guide plate 110 will be described later in greater detail with reference to FIGS. 2 to 7.

The light source module 120 may include the first sub-light source module 120a and the second sub-light source module 120b. The first sub-light source module 120a may provide light to the first incident surface 110a of the light guide plate 110 in the first direction Y1. The second sub-light source module 120b may provide light to the second incident surface 110b of the light guide plate 110 in a second direction Y2 opposite to the first direction Y1.

The first sub-light source module 120a may include a plurality of light sources 121a, a printed circuit board 122a, and a heat dissipation plate 123a. The second sub-light source module 120b may include a plurality of light sources 121b, a printed circuit board 122b, and a heat dissipation plate 123b. The first sub-light source module 120a and the second sub-light source module 120b may have a same configuration as each other except for providing light at different directions. Hereinafter, the first sub-light source module 120a of the light source module 120 will be described in detail, and any repetitive detailed description of the second sub-light source module 120b may be omitted.

The plurality of light sources 121a may be disposed on the printed circuit board 122a along a third direction X1 crossing the first direction Y1. In an embodiment, the plurality of light sources 121a may be a point light source. However, the invention is not limited thereto, and the plurality of light sources 121a may also be a linear light source or a surface light source such as a lamp.

A conductive pattern is disposed on the printed circuit board 122a. Accordingly, the plurality of light sources 121a may receive an electrical signal through the conductive pattern, and may provide light to the first incident surface 110a of the light guide plate 110. The printed circuit board 122a may be disposed on the heat dissipation plate 123a. The heat dissipation plate 123a may dissipate the heat generated from the printed circuit board 122a or the plurality of light sources 121a to the bottom chassis 150 or the like.

The support member 130 and the distance adjusting member 140 will be described later in greater detail with reference to FIGS. 2 to 7.

The bottom chassis 150 may include a bottom surface 150a, a first side surface 150b extending from the bottom surface 150a, a second side surface 150c extending from the bottom surface 150a and facing the first side surface 150b, a third side surface 150e extending from the bottom surface 150a and connected to the first and second side surfaces 150b and 150c, and a fourth side surface 150f extending from the bottom surface 150 and facing the third side surface 150e. The bottom chassis 150 may be connected with the top chassis 300. The bottom chassis 150 may include or be made of a thermally conductive material. Accordingly, the bottom chassis 150 may effectively dissipate the heat transferred from the light source module 120. In an embodiment, as shown in FIG. 1, a first through-hole 150d1 and a second through-hole 150d2 may be defined through the first side surface 150b of the bottom chassis 150. The first through-hole 150d1 and the second through-hole 150d2 will be described with reference to FIGS. 2 to 7.

The optical sheet 160 may be disposed on the light guide plate 110. In an embodiment, the optical sheet 160 may be disposed between the light guide plate 110 and the display panel 200. In an embodiment, the optical sheet 160 may include a diffusion sheet 161 and a prism sheet 162. The diffusion sheet 161 may diffuse the light provided from the light guide plate 110 and provide the diffused light to the display panel 200. The prism sheet 162 may be disposed on the diffusion sheet 161. The prism sheet 162 may condense the light diffused by the diffusion sheet 161 in a direction substantially perpendicular to the lower surface of the display panel 200. In an embodiment, the prism sheet 162 may include a plurality of prism patterns.

The optical sheet 160 may further include a protective sheet (not shown). The protective sheet may be disposed on the prism sheet 162, and may protect the prism sheet 162 from foreign matter such as dust.

The reflective sheet 170 may be disposed on the bottom surface 150a of the bottom chassis 150. In an embodiment, the reflective sheet 170 may be disposed between the bottom surface 150a of the bottom chassis 150 and the light guide plate 110. The reflective sheet 170 may provide the light emitted through the lower surface of the light guide plate 110 back to the light guide plate 110. Here, the lower and upper portions will be defined with reference to FIG. 1. The reflective sheet 170 may include or be made of a plastic material. In one embodiment, for example, the reflective sheet 170 may include or be made of polyethylene terephthalate ("PET"), PC, or the like.

The display panel 200 is a panel for displaying an image. In an embodiment, the display panel 200 may be a liquid crystal display panel. The display panel 200 may include a lower substrate 220, an upper substrate 210 facing the lower substrate 220, and a liquid crystal layer (not shown in the drawing) interposed between the lower substrate 220 and the upper substrate 210. The display panel 200 may be disposed on the backlight unit 100. The display panel 200 may display an image using the light provided from the backlight unit 100.

The top chassis 300 may be disposed on the display panel 200. The top chassis 300 may be disposed to surround the display panel 200, and may be connected with the bottom chassis 150.

An embodiment of the liquid crystal display according to the invention may further include a middle mold 180. The middle mold 180 may be disposed between the display panel 200 and the backlight unit 100. In an embodiment, the middle mold 180 may be disposed between the light guide plate 110 and the optical sheet 160. In an embodiment, the middle mold 180 may be a rectangular frame with an opening formed therein. The middle mold 180 may support the display panel 200 from the lower portion of the display panel 200. In an embodiment, the middle mold 180 may support the optical sheet 160.

Figure 2:
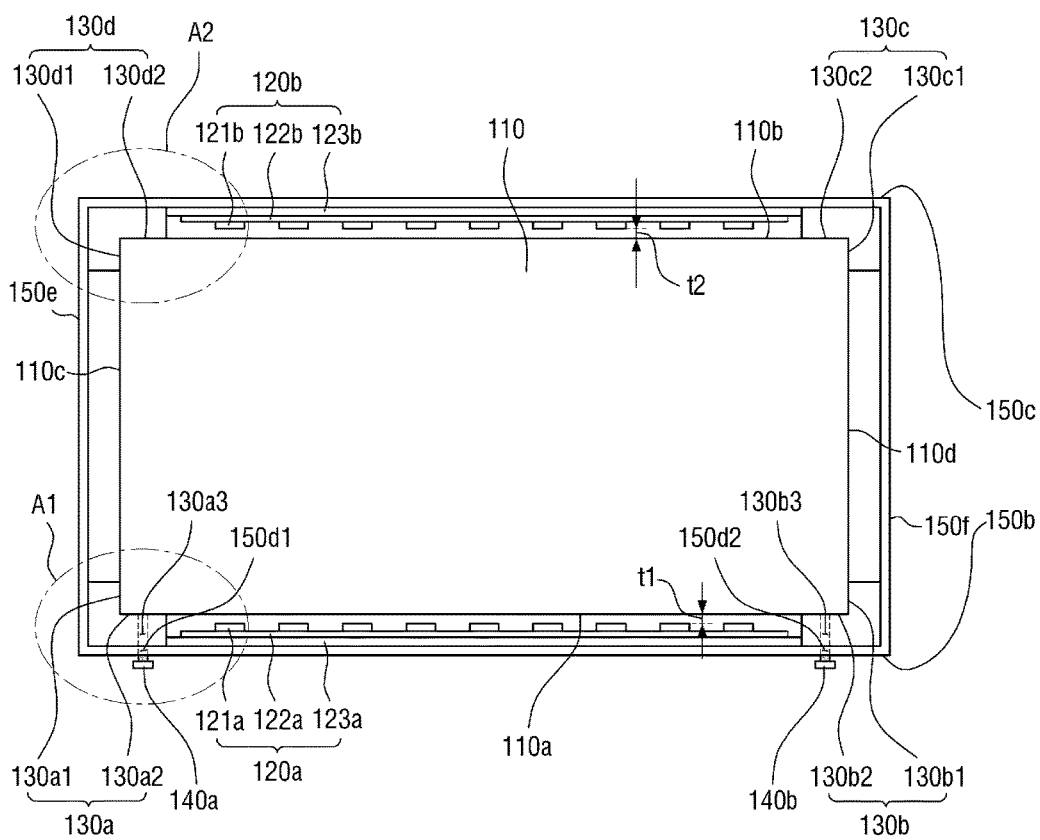
FIG. 2 is a schematic plan view showing a configuration where the light source module, support member and distance adjusting member shown in FIG. 1 are connected with a bottom chassis.
Figure 3:
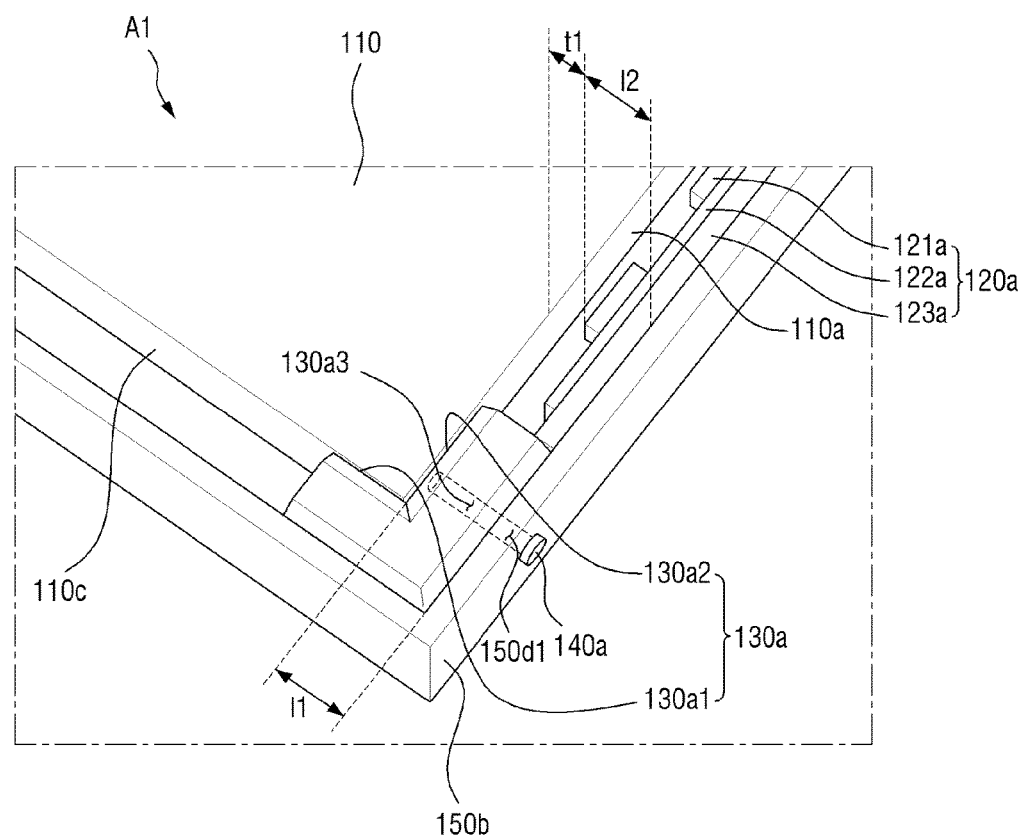
FIG. 3 is an enlarged perspective view of region A1 of FIG. 2.
Figure 3:
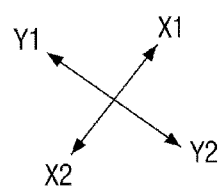
Figure 4:
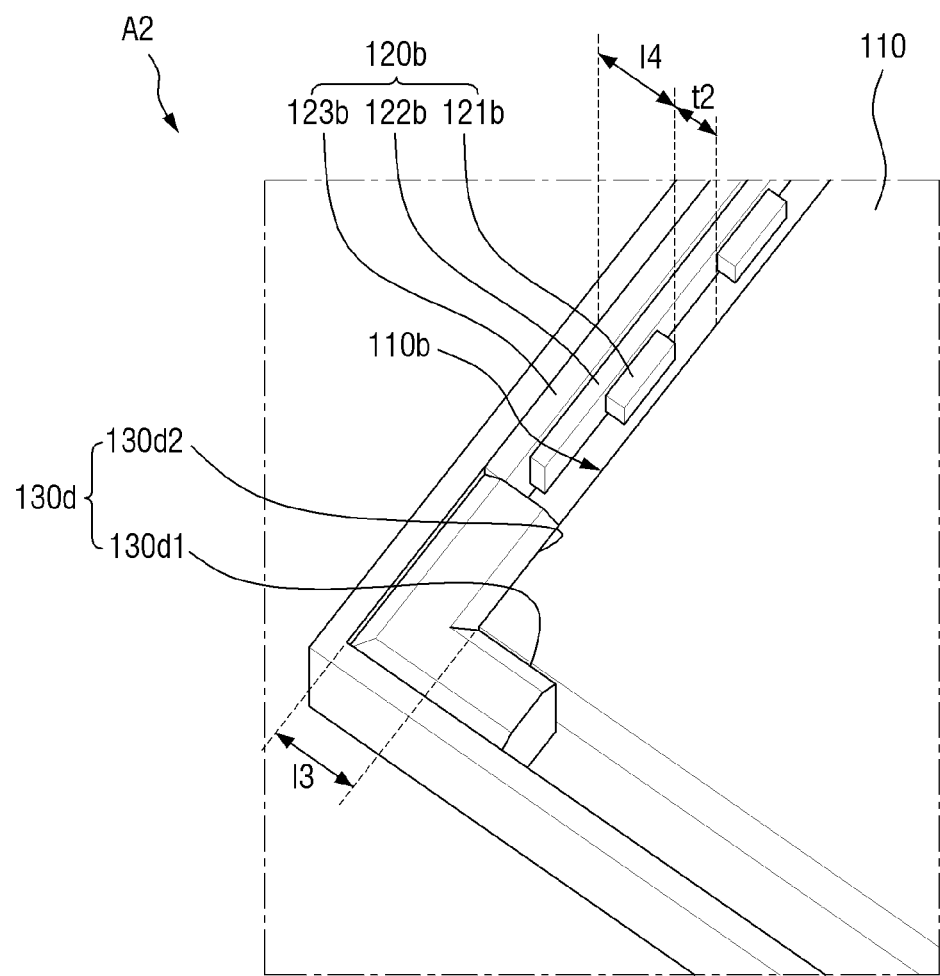
FIG. 4 is an enlarged perspective view of region A2 of FIG. 2.
Figure 4:
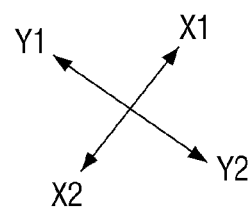
Figure 5:
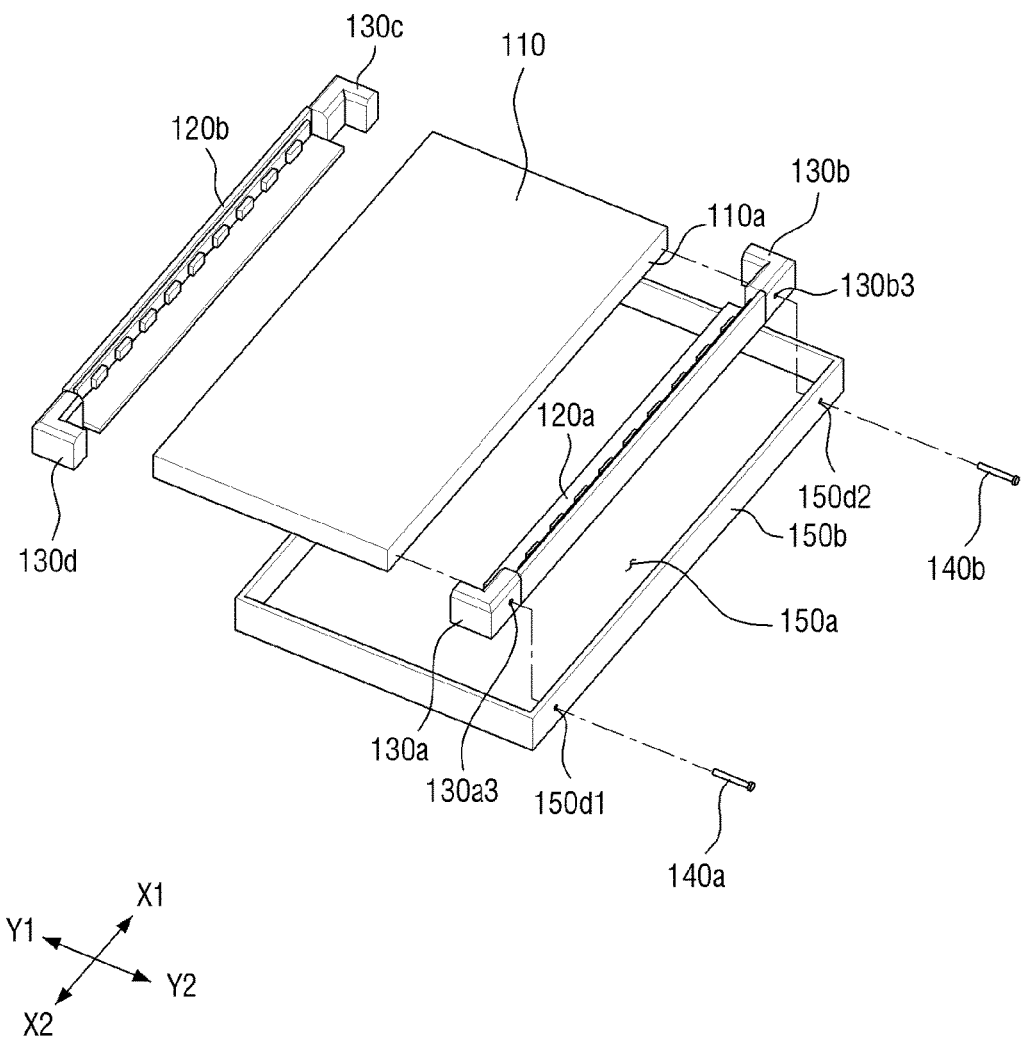
FIG. 5 is an enlarged exploded perspective view of region A1 of FIG. 2.

FIG. 2 is a schematic plan view showing a configuration where the light source module, support member and distance adjusting member shown in FIG. 1 are connected with the bottom chassis. FIG. 3 is an enlarged perspective view of region A1 of FIG. 2. FIG. 4 is an enlarged perspective view of region A2 of FIG. 2. FIG. 5 is an enlarged exploded perspective view of region A1 of FIG. 2.

Referring to FIG. 2, the support member 130 may be disposed on the bottom surface 150a of the bottom chassis 150. The support member may include or be made of a material, such as rubber, silicon, or plastic. In an embodiment, the support member 130 may include first to fourth sub-support members 130a to 130d. The first to fourth sub-support members 130a to 130d may be disposed at four corners of the bottom chassis 150, respectively.

The first and second sub-support members 130a and 130b may be symmetrical to each other with respect to the first sub-light source module 120a. The third and fourth sub-support members 130c and 130d may be symmetrical to each other with respect to the second sub-light source module 120b.

The first sub-support member 130a and the fourth sub-support member 130d may support the first side surface 110c of the light guide plate 110 in the third direction X1. In such an embodiment, a first support surface 130a1 of the first sub-support member 130a and a first support surface 130d1 of the fourth sub-support member 130d may be in contact with the first side surface 110c of the light guide plate 110.

In such an embodiment, since the first sub-support member 130a and the fourth sub-support member 130d include or are made of rubber, silicone, plastic, or the like, the first sub-support member 130a and the fourth sub-support member 130d may expand or contract together with the light guide plate 110 when the light guide plate 110 contracts or expands due to heat, temperature, or the like. Thus, the first support surface 130a1 of the first sub-support member 130a and the first support surface 130d1 of the fourth sub-support member 130d are maintained to be in contact with the first side surface 110c of the light guide plate 110, thereby supporting the first side surface 110c of the light guide plate 110 in the third direction X1.

The second sub-support member 130b and the third sub-support member 130c may support the second side face 110d of the light guide plate 110 in a fourth direction X2 opposite to the third direction X1. In such an embodiment, a first support surface 130b1 of the second sub-support member 130b and a first support surface 130c1 of the third sub-support member 130c may be in contact with the second side surface 110d of the light guide plate 110.

In such an embodiment, since the second sub-support member 130b and the third sub-support member 130c include or are made of rubber, silicone, plastic, or the like, the second sub-support member 130b and the third sub-support member 130c may expand or contract together with the light guide plate 110 when the light guide plate 110 contracts or expands due to heat, temperature, or the like. Thus, the first support surface 130b1 of the second sub-support member 130b and the first support surface 130c1 of the third sub-support member 130c are maintained to be in contact with the second side surface 110d of the light guide plate 110, thereby supporting the second side surface 110d of the light guide plate 110 in the fourth direction X2.

In such an embodiment, the first to fourth sub-support members 130a to 130d minimize the deformation caused by contraction or expansion of the light guide plate 110 or the flow caused by an external impact, to prevent the light guide plate 110 from being warped or broken.

In an embodiment, the first sub-support member 130a and the second sub-support member 130b may support the first incident surface 110a of the light guide plate 110 in the first direction Y1. In such an embodiment, a second support surface 130a2 of the first sub-support member 130a and a second support surface 130b2 of the second sub-support member 130b may be in contact with the first incident surface 110a of the light guide plate 110. Thus, the first incident surface 110a of the light guide plate 110 may be maintained by the support member 130 to be spaced apart from the plurality of light sources 121a of the first sub-light source module 120a by a first distance t1.

Hereinafter, the support member 130 will be described in greater detail based on the first sub-support member 130a with reference to FIG. 3. Referring to FIG. 3, the distance 11 from the first side surface 150b of the bottom chassis 150 to the second support surface 130a2 of the first sub-support member 130a is greater than the distance 12 from the first side surface 150b of the bottom chassis 150 to one of the plurality of light sources 121a. Thus, the first incident surface 110a of the light guide plate 110 may maintained to be spaced apart from the plurality of light sources 121a of the first sub-light source module 120a by a first distance t1.

In an embodiment, the first distance t1 may be defined based on a degree of deformation or expansion of the light guide plate 110 by the heat generated by the light source module 120. In an embodiment, the first distance t1 may be in a range about 0.5 millimeter (mm) to about 0.7 mm. However, the invention is not limited thereto, and the first distance t1 may be changed depending on the size and shape of the display panel 200.

Referring back to FIG. 2, the third sub-support member 130c and the fourth sub-support member 130d may support the second incident surface 110b of the light guide plate 110 in the second direction Y2. In such an embodiment, a second support surface 130c2 of the third sub-support member 130c and a second support surface 130d2 of the fourth sub-support member 130d may be in contact with the second incident surface 110b of the light guide plate 110. Thus, the second incident surface 110b of the light guide plate 110 may be maintained by the support member 130 to be spaced apart from the plurality of light sources 121b of the second sub-light source module 120b by a second distance t2.

Hereinafter, the support member 130 will be described in greater detail based on the fourth sub-support member 130d with reference to FIG. 4. Referring to FIG. 4, the distance 13 from the second side surface 150c of the bottom chassis 150 to the second support surface 130d2 of the fourth sub-support member 130d is greater than the distance 14 from the second side surface 150c of the bottom chassis 150 to one of the plurality of light sources 121b. Thus, the second incident surface 110b of the light guide plate 110 may maintained by the support member 130 to be spaced apart from the plurality of light sources 121b of the second sub-light source module 120b by a second distance t2.

In such an embodiment, the second distance t2 may be defined based on a degree of deformation or expansion of the light guide plate 110 by the heat generated by the light source module 120. In an embodiment, the second distance t2 may be in a range of about 0.5 mm to about 0.7 mm. However, the invention is not limited thereto, and the second distance t2 may be changed depending on the size and shape of the display panel 200.

In an embodiment, since the first incident surface 110a and the second incident surface 110b of the light guide plate 110 are maintained by the support member 130 to be spaced apart from the first sub-light source module 120a by the first distance t1 and from the second sub-light source module 120b by the second distance t2, respectively, the light guide plate 110 is effectively prevented from being damaged by the heat generated from the light source module 120.

Referring back to FIG. 2, the first distance t1 and the second distance t2 may be substantially equal to each other. When the first distance t1 and the second distance t2 are different from each other, the distance by which the light emitted from the first sub-light source module 120a travels to the first incident surface 110a of the light guide plate 110 is different from the distance by which the light emitted from the second sub-light source module 120b travels to the second incident surface 110b of the light guide plate 110, so that the luminance unevenness phenomenon of the entire display panel 200 may occur, and the color uniformity may be lowered, such that display quality may be deteriorated.

In a case, where the first distance t1 is greater than the second distance t2, it means that the distance between the first sub-light source module 120a and the first incident surface 110a of the light guide plate 110 is greater than the distance between the second sub-light source module 120b and the second incident surface 110b of the light guide plate 110, so that the luminance of the region of the display panel 200 near the first sub-light source module 120a is lower than the luminance of the region of the display panel 200 near the second sub-light source module 120b. Therefore, in such a case, the luminance unevenness phenomenon of the entire display panel 200 may occur, and the color uniformity may be lowered.

In an embodiment, the distance adjusting member 140 may adjust the distance between the light guide plate 110 and the first sub-light source module 120a. In an embodiment, the distance adjusting member 140 may include a first sub-distance adjusting member 140a and a second sub-distance adjusting member 140b. In an embodiment, each of the first sub-distance adjusting member 140a and the second sub-distance adjusting member 140b may include or be a cylindrical screw. Hereinafter, for convenience of description, an exemplary embodiment where each of the first sub-distance adjusting member 140a and the second sub-distance adjusting member 140b includes a screw will be described in detail.

The first sub-distance adjusting member 140a may be disposed in the first through-hole 150d1 and the first fastening hole 130a3. Here, fastening holes and through-holes will be described based on the first sub-support member 130a with reference to FIG. 5. Referring to FIG. 5, a first fastening hole 130a3 may be defined through the second support surface 130a2 of the first sub-support member 130a. The first fastening hole 130a3 may be formed at a position corresponding to the first through-hole 150d1 of the first side surface 150b of the bottom chassis 150.

Accordingly, the first sub-distance adjusting member 140a may be inserted into the first fastening hole 130a3 and the first through-hole 150d1 to move in the first direction Y1 or the second direction Y2. Here, when the first sub-distance adjusting member 140a moves in the first direction Y1, the first sub-distance adjusting member 140a may be in direct contact with the first incident surface 110a of the light guide plate 110.

In such an embodiment, the second sub-distance adjusting member 140b may be inserted into the second fastening hole 130b3 and the second through-hole 150d2 to move in the first direction Y1 or the second direction Y2. Here, when the second sub-distance adjusting member 140b moves in the first direction Y1, the second sub-distance adjusting member 140b may be in direct contact with the first incident surface 110a of the light guide plate 110.

In such an embodiment, when the first sub-distance adjusting member 140a and the second sub-distance adjusting member 140b are screwed, the first sub-distance adjusting member 140a and the second sub-distance adjusting member 140b may move in the first direction Y1. Here, when the first sub-distance adjusting member 140a and the second sub-distance adjusting member 140b continue to be screwed even after the first sub-distance adjusting member 140a and the second sub-distance adjusting member 140b are in contact with the first incident surface 110a of the light guide plate 110, the light guide plate may move in the first direction Y1.

The light guide plate 110 may expand or contract due to heat, humidity, or the like. Also, as error occur during the process of manufacturing or assembling the backlight unit 100, the first distance t1 between the light guide plate 110 and the first sub-light source module 120a and the second distance t2 between the light guide plate 110 and the second sub-light source module 120b may become different from each other.

Figure 6:
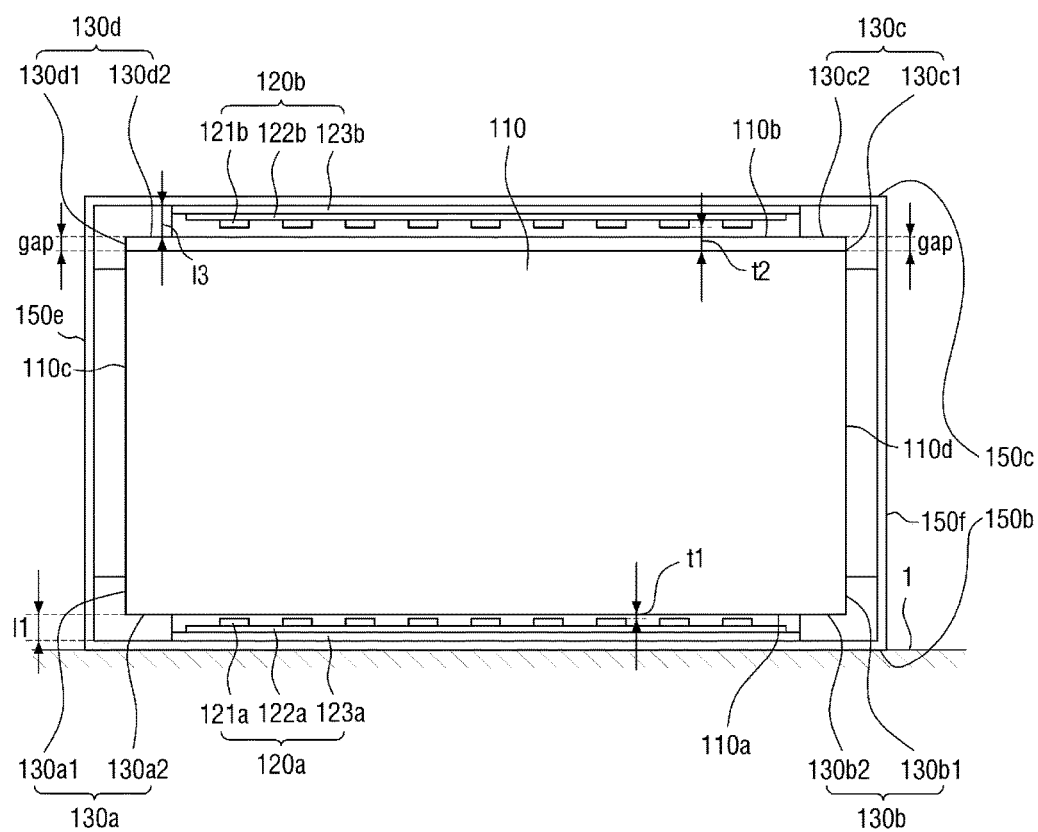
FIG. 6 is a schematic plan view of a configuration where the light source module, support member and distance adjusting member are connected with a bottom chassis on the bottom surface.
Figure 7:
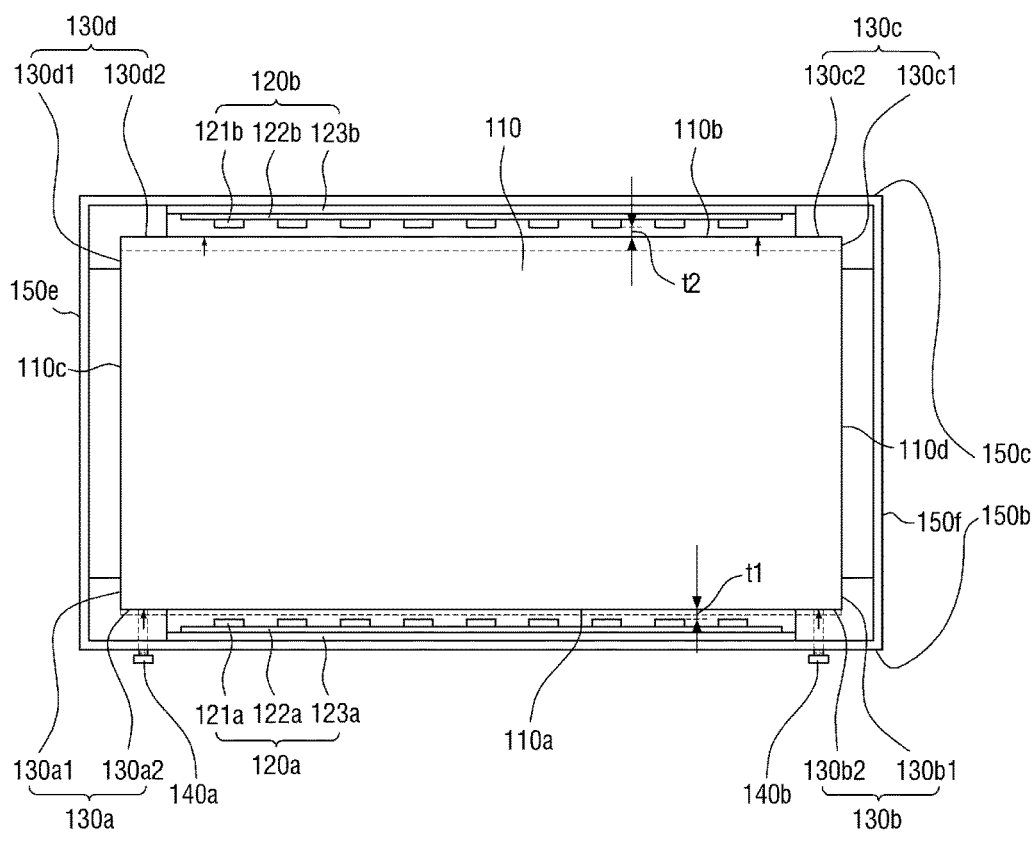
FIG. 7 is a schematic plan view showing a procedure of moving a light guide plate using a distance adjusting member in the configuration where the light source module, support member and distance adjusting member are connected with a bottom chassis, shown in FIG. 6.

FIG. 6 is a schematic plan view showing a configuration where the light source module, support member and distance adjusting member are connected with a bottom chassis on a virtual plane. FIG. 7 is a schematic plan view for showing a procedure of moving a light guide plate using a distance adjusting member in the configuration where the light source module, support member and distance adjusting member are connected with a bottom chassis, shown in FIG. 6. FIG. 6 shows a case where the first sub-distance adjusting member 140a and the second sub-distance adjusting member 140b are omitted (or in a state where the first sub-distance adjusting member 140a and the second sub-distance adjusting member 140b are released).

Referring to FIG. 6, assuming that the first side surface 150b of the bottom chassis 150 is disposed perpendicular to a virtual plane 1 to be in contact with the virtual plane 1, the light guide plate 110 may move in the second direction Y2. When the light guide plate 110 moves in the second direction Y2, the light guide plate 110 may be supported by the first sub-support member 130a and the second sub-support member 130b, but the light guide plate 110 may move in the second direction Y2 when the first sub-support member 130a and the second sub-support member 130b, which include or are made of a material such as rubber, is contracted or the light guide plate 110 is contracted by heat or the like.

FIG. 6 shows a case where the first sub-support member 130a and the second sub-support member 130b are contracted. Referring to FIG. 6, as the first sub-support member 130a and the second sub-support member 130b are contracted, the distance l1 from the first side surface 150b of the bottom chassis 150 to the second support surface 130a2 of the first sub-support member 130a may be smaller than the distance l3 from the second side surface 150c of the bottom chassis 150 to the second support surface 130d2 of the fourth sub-support member 130d. Thus, a gap exists between the second support surface 130d2 of the fourth sub support member 130d (or the second support surface 130c2 of the third sub support member 130c) and the light guide plate 110.

In such a state, the first distance t1 may be smaller than the second distance t2. As described above, when the first distance t1 and the second distance t2 become different from each other, the luminance unevenness phenomenon of the entire display panel 200 may occur, and color uniformity may be lowered, thereby deteriorating display quality.

Referring to Table 1 below, color uniformity is lowered as the difference (absolute value) between the first distance t1 and the second distance t2 increases.

TABLE 1

| Difference (mm) | 0.1 | 0.2 | 0.3 | 0.4 | 0.5 |
|---|---|---|---|---|---|
| Color uniformity (%) | 91 | 87 | 81 | 78 | 69 |

Referring to FIG. 7, in an embodiment of the liquid crystal display device according to the invention, the first sub-distance adjusting member 140a and the second sub-distance adjusting member 140b may move in the first direction Y1 when the light guide plate 110 moves in the second direction Y2. In such an embodiment, the bottom surface 140a1 of the first sub-distance adjusting member 140a and the second sub-distance adjusting member 140b push the first incident surface 110a of the light guide plate 110 to move the light guide plate 110 in the first direction Y1. Thus, the first distance t1 between the light guide plate 110 and the first sub-light source module 120a and the second distance t2 between the light guide plate 110 and the second sub-light source module 120b may be maintained substantially equal to each other. Therefore, the gap (refer to FIG. 6) between the second support surface 130d2 of the fourth sub-support member 130d (or the second support surface 130c2 of the third sub-support member 130c) and the light guide plate 110 may be compensated or removed.

Therefore, in an embodiment of the liquid crystal display device according to the invention, even when the first distance t1 and the second distance t2 become different from each other as shown in FIG. 6, the first distance t1 and the second distance t2 may be set to be substantially equal to each other by moving the light guide plate 110 using the first sub-distance adjusting member 140a and the second sub-distance adjusting member 140b.

Accordingly, in such an embodiment, the luminance unevenness phenomenon of the entire display panel 200 and the color uniformity deterioration phenomenon may be effectively prevented.

In an embodiment of the liquid crystal display device according to the invention, even after the backlight unit 100 is assembled, the gap between the light guide plate 110 and the light source module 120 may be adjusted using the first sub-distance adjusting member 140a and the second sub-distance adjusting member 140b, to improve the convenience of a process.

FIGS. 1 to 7 show embodiments where each of the first sub-distance adjusting member 140a and the second sub-distance adjusting member 140b is a single screw, as an example, but the invention is not limited thereto. In an alternative embodiment, each of the first sub-distance adjusting member 140a and the second sub-distance adjusting member 140b may be a plurality of screws. In another alternative embodiment, each of the first sub-distance adjusting member 140a and the second sub-distance adjusting member 140b may be different from each other in kind, shape, number and the like.

Figure 8:
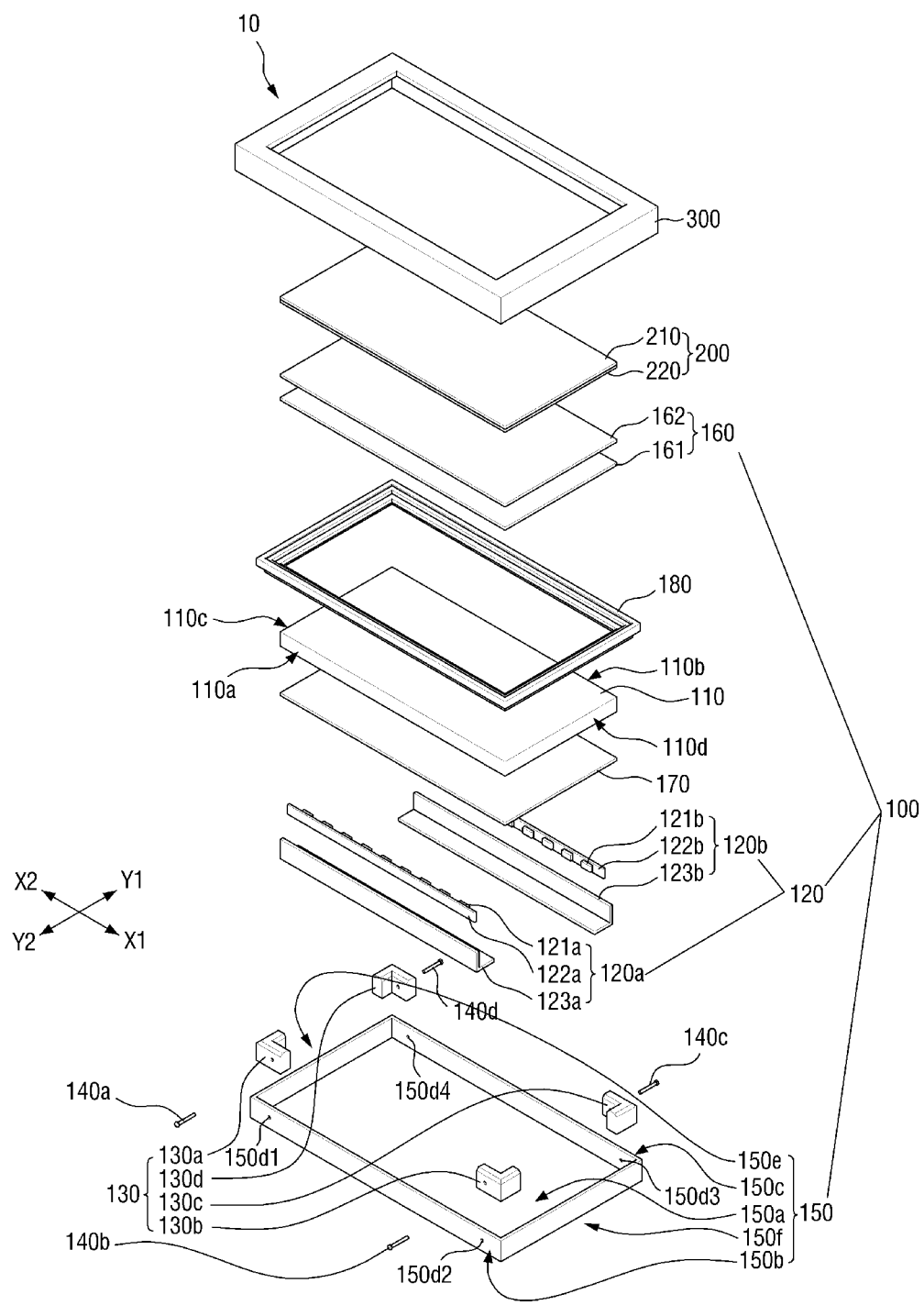
FIG. 8 is an exploded perspective view showing a liquid crystal display device according to an alternative embodiment of the invention.
Figure 9:
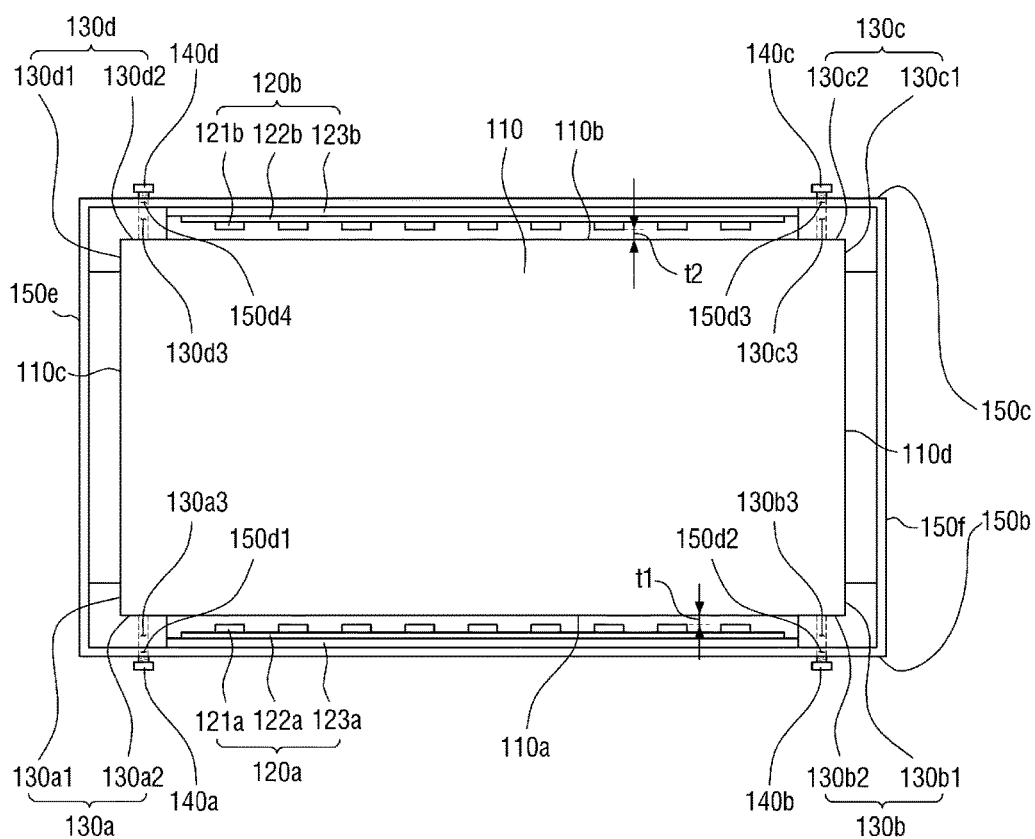
FIG. 9 is a schematic plan view showing a configuration where the light source module, support member and distance adjusting member shown in FIG. 8 are connected with a bottom chassis.

FIG. 8 is an exploded perspective view showing a liquid crystal display device according to an alternative embodiment of the invention. FIG. 9 is a schematic plan view showing a configuration where the light source module, support member and distance adjusting member shown in FIG. 8 are connected with a bottom chassis. An embodiment of the liquid crystal display device shown in FIGS. 8 and 9 is substantially the same as the embodiments described above with reference to FIGS. 1 to 7, and any repetitive detailed description of the same or like elements thereof will be omitted.

Referring to FIGS. 8 and 9, in an embodiment, the distance adjusting member 140 may further include a screw type third sub-distance adjusting member 140c and a screw type fourth sub-distance adjusting member 140d. In such an embodiment, third and fourth through-holes 150d3 and 150d4 are defined in the second side surface 150c of the bottom chassis 150. In such an embodiment, a third fastening hole 130c3 is defined in the second support surface 130c2 of the third sub-support member 130c, and a fourth fastening hole 130d3 is defined in the second support surface 130d2 of the fourth sub-support member 130d.

The third fastening hole 130c3 may be formed at a position corresponding to the third through-hole 150d3 in the second side surface 150c of the bottom chassis 150. The fourth fastening hole 130d3 may be formed at a position corresponding to the fourth through-hole 150d4 in the second side surface 150c of the bottom chassis 150.

The third sub-distance adjusting member 140c may be disposed through the third through-hole 150d3 and the third fastening hole 130c3. The fourth sub-distance adjusting member 140d may be disposed through the fourth through-hole 150d4 and the fourth fastening hole 130d3. Accordingly, the third sub-distance adjusting member 140c and the fourth sub-distance adjusting member 140d may move in the first direction Y1 or the second direction Y2.

The third sub-distance adjusting member 140c and the fourth sub-distance adjusting member 140d may be in direct contact with the second incident surface 110b of the light guide plate 110 when each of the third sub-distance adjusting member 140c and the fourth sub-distance adjusting member 140d moves in the second direction Y2. Thus, the third sub-distance adjusting member 140c and the fourth sub-distance adjusting member 140d may push the second incident surface 110b of the light guide plate 110 in the second direction Y2, to adjust the distance between the second sub-light source module 120b and the light guide plate 110.

Figure 10:
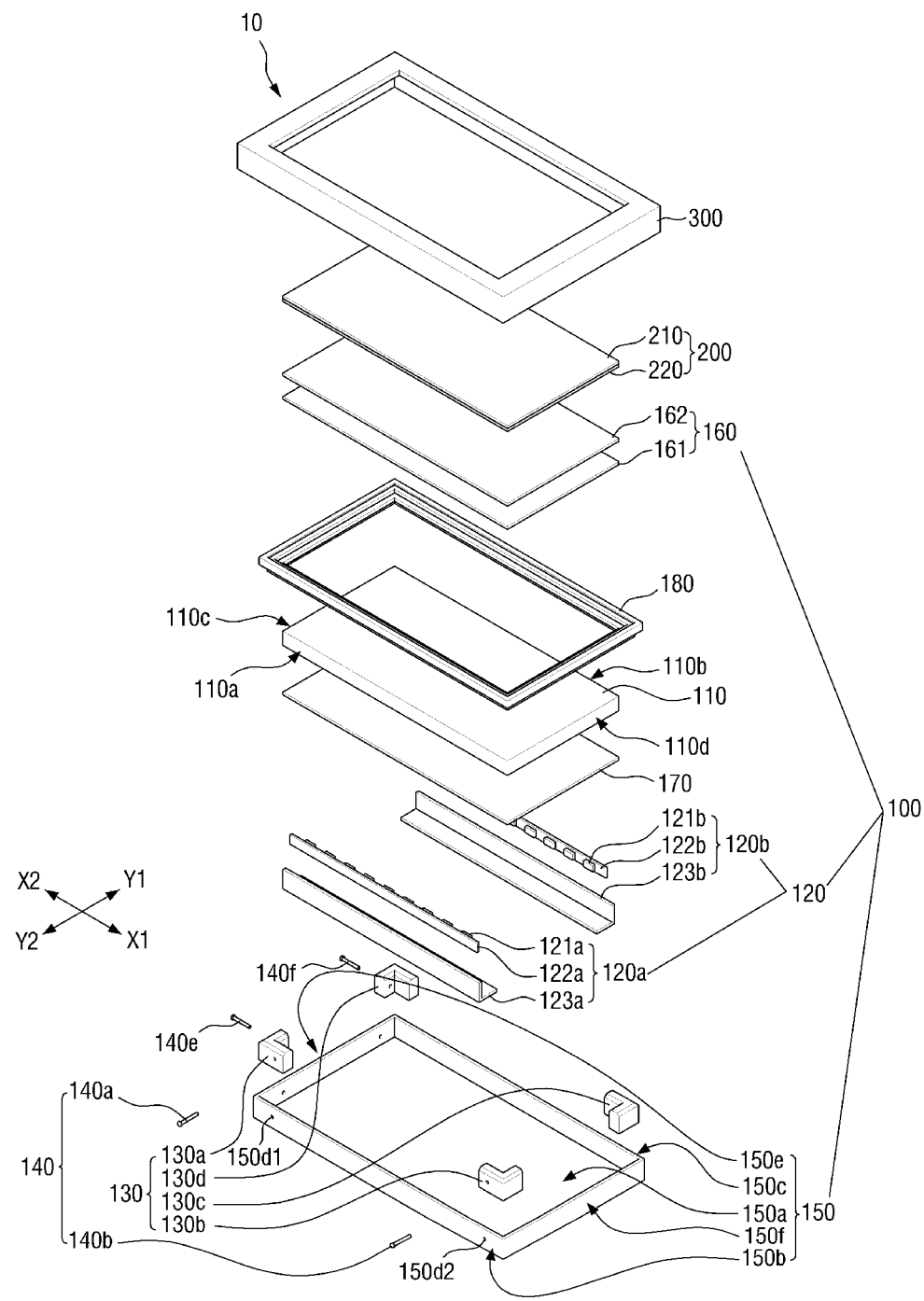
FIG. 10 is an exploded perspective view showing a liquid crystal display device according to another alternative embodiment of the invention.
Figure 11:
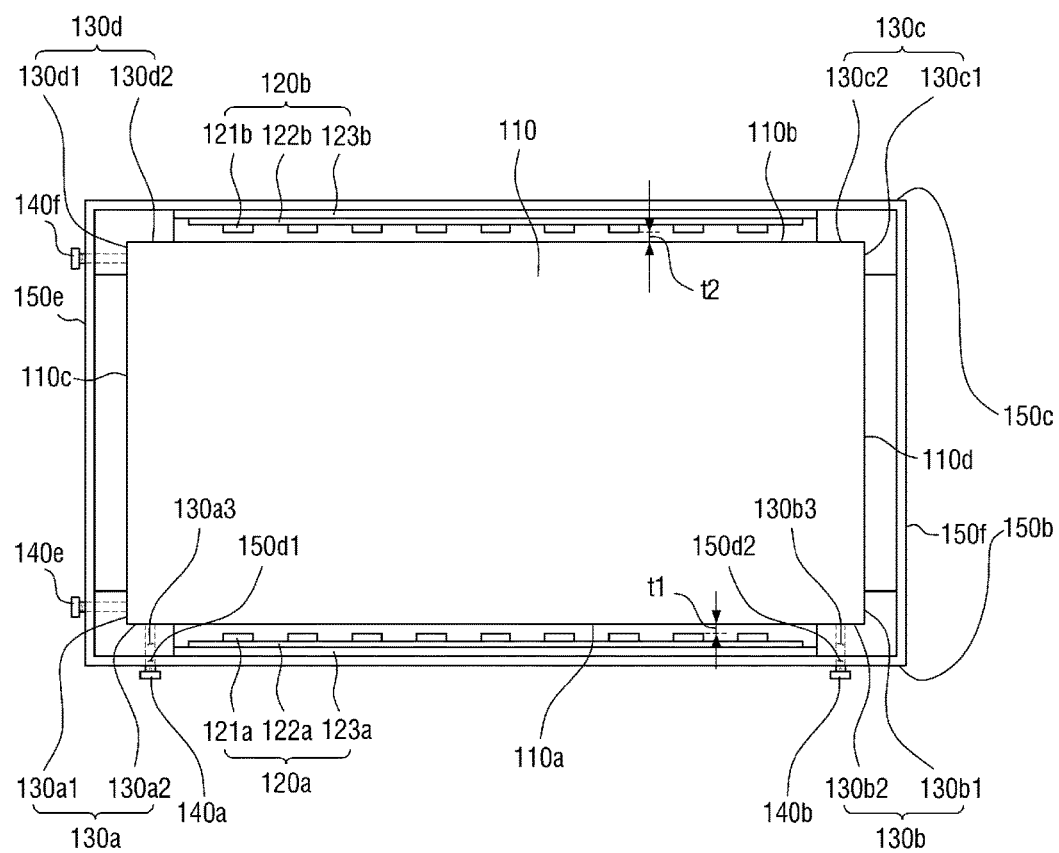
FIG. 11 is a schematic plan view showing a configuration where the light source module, support member and distance adjusting member shown in FIG. 10 are connected with a bottom chassis.

FIG. 10 is an exploded perspective view showing a liquid crystal display device according to another alternative embodiment of the invention. FIG. 11 is a schematic plan view showing a configuration where the light source module, support member and distance adjusting member shown in FIG. 10 are connected with a bottom chassis. An embodiment of the liquid crystal display device shown in FIGS. 10 and 11 is substantially the same as the embodiments described above with reference to FIGS. 1 to 9, and any repetitive detailed description of the same or like elements thereof will be omitted.

Referring to FIGS. 10 and 11, in an embodiment, the distance adjusting member 140 may further include a screw type fifth sub-distance adjusting member 140e and a screw type sixth sub-distance adjusting member 140f.

The fifth sub-distance adjusting member 140e may be disposed through the third side surface 150e of the bottom chassis 150 and the first support surface 130d1 of the fourth sub-support member 130d to be in direct contact with the first side surface 110c of the light guide plate 110. The sixth sub-distance adjusting member 140f may be disposed through the third side surface 150e of the bottom chassis 150 and the first support surface 130a1 of the first sub-support member 130a to be in direct contact with the first side surface 110c of the light guide plate 110.

Thus, the fifth sub-distance adjusting member 140e and the sixth sub-distance adjusting member 140f may push the first side surface 110c of the light guide plate 110 in the third direction X1, to adjust the position of the light guide plate 110.

In an alternative embodiment, the fifth sub-distance adjusting member 140e and the sixth sub-distance adjusting member 140f may be disposed to be in direct contact with the second side surface 110d of the light guide plate 110. In such an embodiment, the fifth sub-distance adjusting member 140e and the sixth sub-distance adjusting member 140f may push the second side surface 110d of the light guide plate 110 in the fourth direction X2, to adjust the position of the light guide plate 110.

Another alternative embodiment of the liquid crystal display may include a plurality of sub-distance adjusting members that are in contact with both the first side surface 110c of the light guide plate 110 and the second side surface 110d of the light guide plate 110.

Figure 12:
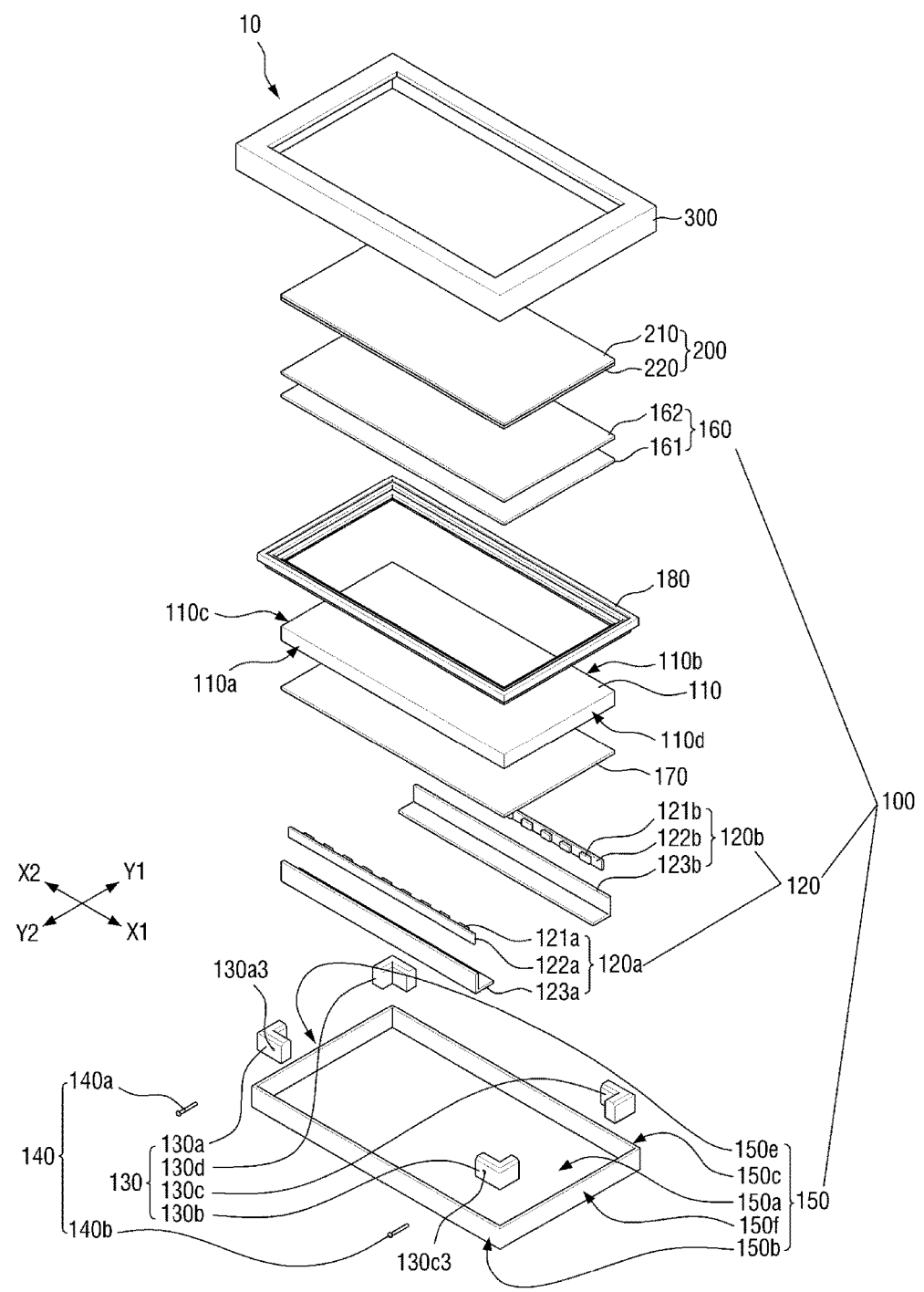
FIG. 12 is an exploded perspective view showing a liquid crystal display device according to still another alternative embodiment of the invention.
Figure 13:
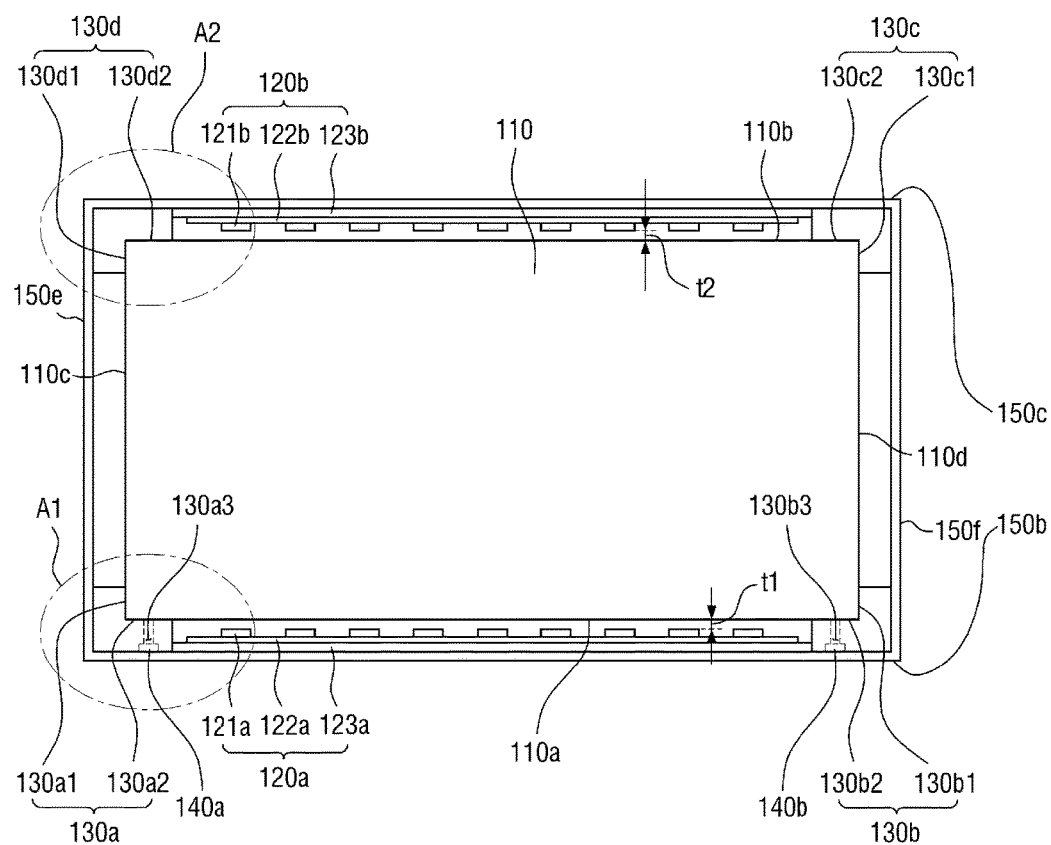
FIG. 13 is a schematic plan view showing a configuration where the light source module, support member and distance adjusting member shown in FIG. 12 are connected with a bottom chassis.
Figure 14:
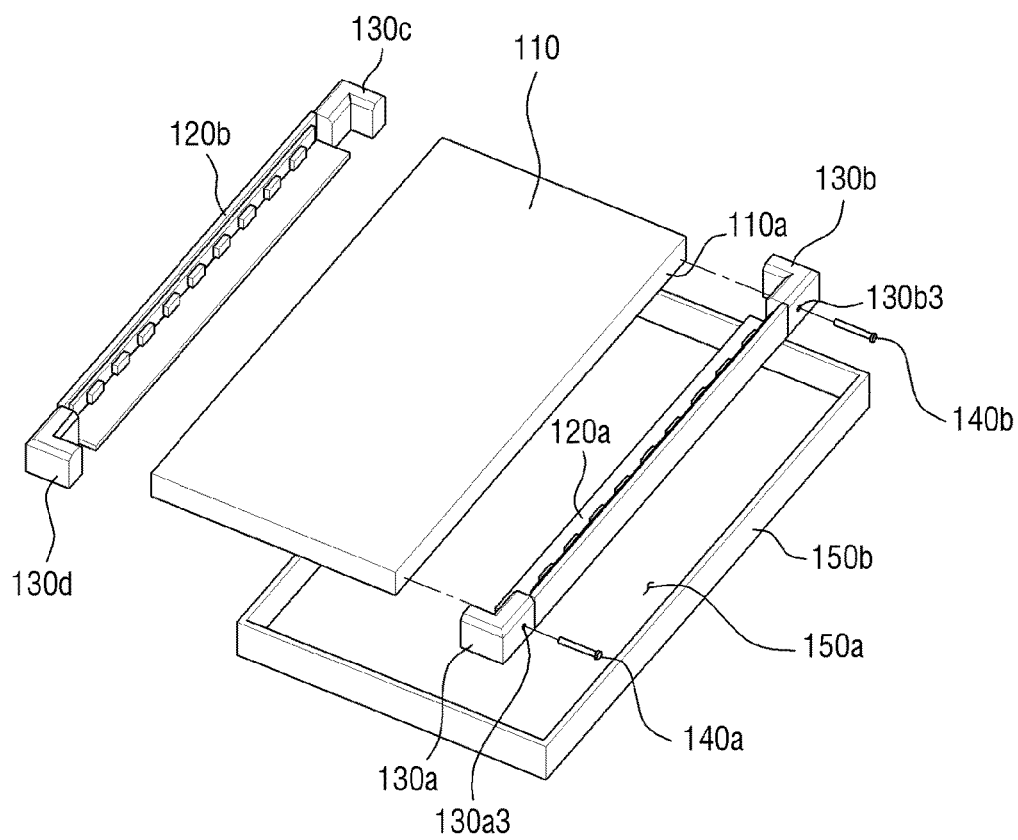
FIG. 14 is an exploded perspective view of a configuration where the light source module, support member and distance adjusting member shown in FIG. 13 are connected with a bottom chassis.

FIG. 12 is an exploded perspective view showing a liquid crystal display device according to still another alternative embodiment of the invention. FIG. 13 is a schematic plan view showing a configuration where the light source module, support member and distance adjusting member shown in FIG. 12 are connected with a bottom chassis. FIG. 14 is an exploded perspective view of a configuration where the light source module, support member and distance adjusting member shown in FIG. 13 are connected with a bottom chassis. An embodiment of the liquid crystal display device shown in FIGS. 12 to 14 is substantially the same as the embodiments described above with reference to FIGS. 1 to 11, and any repetitive detailed description of the same or like elements thereof will be omitted.

For convenience of description, an embodiment of the liquid crystal display device shown in FIGS. 12 to 14 will be described based on the first sub-distance adjusting member 140a.

The first side surface 150b of the bottom chassis 150 is not provided with the first through-hole 150d1 and second through-hole 150d2 formed therethrough as shown in FIG. 1.

In such an embodiment, the first sub-distance adjusting member 140a may be inserted into the first fastening hole 130a3 defined in the second support surface 130a2 of the first sub-support member 130a to move only along the first fastening hole 130a3 in the first direction Y1 or the second direction Y2.

In such an embodiment of the liquid crystal display device, the fastening hole, into which the distance adjusting member 140 is inserted, may not be formed in the bottom chassis, but formed only in the support member 130. Therefore, an additional hole may not be formed in the bottom chassis 150, and thus the efficiency in the process may be increased.

In an embodiment, although not shown in the drawing, when the middle mold 180 (refer to FIG. 1) is disposed between the bottom chassis 150 and the support member 130, the distance adjusting member 140 may be connected with all of the bottom chassis 150, the support member 130 and the middle mold 180, or may be connected with only the middle mold 180 and the support member 130. In an embodiment, the distance adjusting member 140 may be connected with only the support member 130.

In an embodiment, where the middle mold 180 serves as the support member 130 due to the absence of the support member 130, the distance adjusting member 140 may be connected with the middle mold 180 and the bottom chassis 150.

In such an embodiment, the distance adjusting member 140 may be different in coupling components. In one embodiment, where a specific component is connected with the distance adjusting member 140, the specific component may have a hole for accommodating the distance adjusting member 140. In such an embodiment, the shape and size of the distance adjusting member 140 are not particularly limited as long as the distance adjusting member 140 is allowed to move the light guide plate by making contact with the light guide plate 110.

As described above, according to embodiments of the invention, the distance between the light guide plate and the light source module is adjusted by moving the light guide plate using the distance adjusting member.

In such embodiments, a luminance unevenness phenomenon is effectively prevented and color uniformity is improved, by adjusting the distance between the light guide plate and the light source module.

In such embodiments, e the convenience in the process is improved by moving the light guide plate even after assembling the backlight unit.

Although some exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A backlight unit, comprising:
   a light guide plate including a first incident surface;
   a light source module including a first sub-light source module overlapping the first incident surface of the light guide plate in a first direction, wherein the first sub-light source module provides light to the first incident surface; and
   a distance adjusting member including:
   a first sub-distance adjusting member overlapping the first incident surface of the light guide plate in the first direction and disposed at a first side of the first sub-light source module; and
   a second sub-distance adjusting member disposed at a second side of the first sub-light source module, which is opposite to the first side of the first sub-light source module,
   wherein the first sub-distance adjusting member and the second sub-distance adjusting member are configured to move the light guide plate in the first direction, and
   wherein each of the first sub-distance adjusting member and the second sub-distance adjusting member is a screw which moves in the first direction when the screw is rotated.

2. The backlight unit of claim 1, wherein
   the first sub-distance adjusting member, the second sub-distance adjusting member and the first sub-light source module overlap one another in a third direction intersecting the first direction.

3. The backlight unit of claim 1, wherein
   a distance between the first sub-light source module and the first incident surface of the light guide plate is in a range of about 0.5 mm to about 0.7 mm.

4. The backlight unit of claim 1, further comprising:
   a first sub-support member connected with the first sub-distance adjusting member; and
   a second sub-support member connected with the second sub-distance adjusting member,
   wherein the first sub-support member and the second sub-support member supports the first incident surface of the light guide plate.

5. The backlight unit of claim 4, wherein
each of the first sub-distance adjusting member and the second sub-distance adjusting member includes a support surface contacting the first incident surface,
a first fastening hole, into which the first sub-distance adjusting member is inserted, is defined in the support surface of the first sub-support member, and
a second fastening hole, into which the second sub-distance adjusting member is inserted, is defined in the support surface of the second sub-support member.

6. The backlight unit of claim 5, further comprising:
a bottom chassis which accommodates the light guide plate and the first sub-light source module,
wherein
a first through-hole overlapping the first fastening hole and a second through-hole overlapping the second fastening hole are defined in the first side surface of the bottom chassis,
the first sub-distance adjusting member is inserted into the first through-hole and the first fastening hole, and
the second sub-distance adjusting member is inserted into the second through-hole and the second fastening hole.

7. The backlight unit of claim 1, wherein
the light guide plate further includes a second incident surface opposite to the first incident surface, and
the light source module further includes a second sub-light source module facing the first sub-light source module with respect to the light guide plate.

8. The backlight unit of claim 7, wherein
a distance between the first incident surface of the light guide plate and the first sub-light source module and a distance between the second incident surface of the light guide plate and the second sub-light source module are equal to each other.

9. The backlight unit of claim 7, wherein
the distance adjusting member further includes:
a third sub-distance adjusting member facing the second sub-distance adjusting member with respect to the light guide plate; and
a fourth sub-distance adjusting member facing the first sub-distance adjusting member with respect to the light guide plate,
wherein the third sub-distance adjusting member and the fourth sub-distance adjusting member moves the light guide plate in a second direction opposite to the first direction.

10. The backlight unit of claim 9, further comprising:
a third sub-support member connected with the third sub-distance adjusting member; and
a fourth sub-support member connected with the fourth sub-distance adjusting member,
wherein the third sub-support member and the fourth sub-support member supports the second incident surface of the light guide plate.

11. The backlight unit of claim 10, wherein
each of the third sub-distance adjusting member and the fourth sub-distance adjusting member includes a support surface contacting the second incident surface,
a third fastening hole, into which the third sub-distance adjusting member is inserted, is defined in the support surface of the third sub-support member, and
a fourth fastening hole, into which the fourth sub-distance adjusting member is inserted, is defined in the support surface of the fourth sub-support member.

12. A liquid crystal display device, comprising:
a display panel;
a light guide plate disposed under the display panel;
a light source module including a first sub-light source module overlapping a first side surface of the light guide plate in a first direction; and
a first distance adjusting member configured to press a second side surface of the light guide plate to move the light guide plate in the first direction, wherein the second side surface is opposite to the first side surface,
wherein the first distance adjusting member includes a screw which moves in the first direction when the screw is rotated, and
wherein the screw is configured to press the second side surface of the light guide plate.

13. The liquid crystal display device of claim 12, further comprising:
a second distance adjusting member which presses the second side surface of the light guide plate to move the light guide plate in a second direction opposite to the first direction.

14. The liquid crystal display device of claim 12, wherein
a distance between the first sub-light source module and the first side surface of the light guide plate is in a range of about 0.5 mm to about 0.7 mm.

15. The liquid crystal display device of claim 12, wherein
the first distance adjusting member includes:
a first sub-distance adjusting member; and
a second sub-distance adjusting member overlapping the first sub-light source module in a third direction intersecting the first direction, and
the first sub-distance adjusting member faces the second sub-distance adjusting member with respect to the first sub-light source module.

16. The liquid crystal display device of claim 15, further comprising:
a support member including: a first sub-support member connected with the first sub-distance adjusting member; and a second sub-support member connected with the second sub-distance adjusting member,
wherein the first sub-support member and the second sub-support member includes a support surface contacting the first side surface of the light guide plate.

17. The liquid crystal display device of claim 16, wherein
a shortest distance from the first side surface of the light guide plate to the support surface of the first sub-support member is shorter than a shortest distance from the first side surface of the light guide plate to the first sub-light source module.

18. The liquid crystal display device of claim 16, wherein
the first sub-distance adjusting member is disposed through the support surface of the first sub-support member, and
the second sub-distance adjusting member is disposed through the support surface of the second sub-support member.

19. The liquid crystal display device of claim 16, further comprising:
a bottom chassis including: a bottom surface, on which the light guide plate is disposed; and a side surface extending from the bottom surface,
wherein
the side surface of the bottom chassis overlaps the first side surface of the light guide plate, and
the first sub-distance adjusting member and the second sub-distance adjusting member is disposed through the side surface of the bottom chassis.

20. The liquid crystal display device of claim 12, wherein
the light source module further include a second sub-light source module facing the first sub-light source module with respect to the light guide plate, and
a distance between the first side surface of the light guide plate and the first sub-light source module and a distance between the second side surface of the light guide plate and the second sub-light source module are equal to each other.

\* \* \* \* \*